US012578580B2

(12) United States Patent
Yona

(10) Patent No.: US 12,578,580 B2
(45) Date of Patent: Mar. 17, 2026

(54) GLASSES AUGMENTED PASSIVE DEVICE FOR COMBINING HANDHELD DISPLAY WITH SURROUNDING SCENERY

(71) Applicant: Zvi Albert Yona, Pards-Hanna Karkur (IL)

(72) Inventor: Zvi Albert Yona, Pards-Hanna Karkur (IL)

( * ) Notice: Subject to any disclaimer, the term of this patent is extended or adjusted under 35 U.S.C. 154(b) by 0 days.

(21) Appl. No.: 19/236,972

(22) Filed: Jun. 12, 2025

(65) Prior Publication Data

US 2025/0306381 A1     Oct. 2, 2025

Related U.S. Application Data

(63) Continuation of application No. 18/966,478, filed on Dec. 3, 2024.

(Continued)

(51) Int. Cl.
*G02B 27/00*     (2006.01)
*G02B 1/11*     (2015.01)
(Continued)

(52) U.S. Cl.
CPC ............ *G02B 27/0172* (2013.01); *G02B 1/11* (2013.01); *G02B 27/0075* (2013.01); (Continued)

(58) Field of Classification Search
CPC .. G02B 27/0172; G02B 1/11; G02B 27/0075; G02B 27/0179; G02B 27/1066; (Continued)

(56) References Cited

U.S. PATENT DOCUMENTS

| | | | |
|---|---|---|---|
| 2,255,197 A | 9/1941 | Thomas | |
| 2,570,718 A | 10/1951 | Rooney | |

(Continued)

FOREIGN PATENT DOCUMENTS

| | | | |
|---|---|---|---|
| CA | 2268196 C | 5/2002 | |
| CN | 2067838 U | 12/1990 | |

(Continued)

*Primary Examiner* — Henry Duong
(74) *Attorney, Agent, or Firm* — SankerIP

(57) ABSTRACT

A Glasses Augmented Passive Device (GAPD) for combining a down display image of a handheld device over a transparent or semi-transparent optical combiner, known as HMD (Head Mounted Display). The GAPD pertains to a reflected optical system producing an augmented image of a hand-held display device overlaid on the normally viewed scenery. The device may be a standalone single block device mounted on the glasses lens(es) or embedded in one or more of the lenses using surface optics. The device keeps all handheld devices benefits and operation, smartphones for example, while minimizing headwear gears and mass. A user enjoys all smartphone benefits that appear on his normal sight without the disadvantages of HMD and solves the Missing Socialization and Missing Situation Awareness problems of our generation while engaging in daily activity. The use of surface optic technology offers a simple implementation of the invention on a variety of glasses.

23 Claims, 10 Drawing Sheets

Related U.S. Application Data

(60) Provisional application No. 63/625,459, filed on Jan. 26, 2024.

(51) Int. Cl.

| | |
|---|---|
| *G02B 27/01* | (2006.01) |
| *G02B 27/10* | (2006.01) |
| *G02C 7/08* | (2006.01) |
| *G02C 9/04* | (2006.01) |

(52) U.S. Cl.
CPC ..... *G02B 27/0179* (2013.01); *G02B 27/1066* (2013.01); *G02C 7/086* (2013.01); *G02C 9/04* (2013.01); *G02B 2027/0118* (2013.01); *G02B 2027/0134* (2013.01); *G02B 2027/0178* (2013.01); *G02B 2027/0187* (2013.01)

(58) Field of Classification Search
CPC .... G02B 2027/0118; G02B 2027/0134; G02B 2027/0178; G02B 2027/0187; G02B 27/01; G02B 27/0101; G02B 27/0103; G02B 27/0149; G02B 27/017; G02B 27/0176; G02B 2027/0105; G02B 27/0189; G02B 2027/0107; G02B 2027/0109; G02B 2027/011; G02B 2027/0112; G02B 2027/0114; G02B 2027/0116; G02B 2027/012; G02B 2027/0121; G02B 2027/0123; G02B 2027/0125; G02B 2027/0127; G02B 2027/0129; G02B 2027/013; G02B 2027/0132; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/019; G02B 2027/0192; G02B 2027/0194; G02B 2027/0196; G02B 2027/0198; G02C 7/086; G02C 9/04

USPC ........................................................ 359/630
See application file for complete search history.

(56) References Cited

U.S. PATENT DOCUMENTS

| | | | | |
|---|---|---|---|---|
| 3,495,898 | A | | 2/1970 | Del Vecchio |
| 4,493,538 | A | | 1/1985 | Tolliver |
| 4,647,165 | A | | 3/1987 | Lewis |
| 4,869,575 | A | * | 9/1989 | Kubik ...................... G02C 9/04 |
| | | | | 359/431 |
| 5,506,728 | A | | 4/1996 | Edwards et al. |
| 5,724,163 | A | | 3/1998 | David |
| 5,760,865 | A | | 6/1998 | Webster |
| 6,384,982 | B1 | | 5/2002 | Spitzer |
| 6,577,411 | B1 | | 6/2003 | David |
| 6,761,450 | B1 | | 7/2004 | Baum et al. |
| 7,494,219 | B2 | | 2/2009 | Shahkarami |
| 7,542,204 | B2 | | 6/2009 | Fante et al. |
| 10,642,044 | B2 | | 5/2020 | Ouderkirk et al. |
| 11,256,111 | B2 | | 2/2022 | Fongen |
| 11,347,082 | B2 | | 5/2022 | Lapidot et al. |
| 12,174,387 | B1 | * | 12/2024 | Chiang .............. G02B 27/0955 |
| 2006/0018014 | A1 | | 1/2006 | Niv et al. |
| 2006/0018024 | A1 | | 1/2006 | Bryant et al. |
| 2008/0055541 | A1 | * | 3/2008 | Coulter .................. G02C 7/101 |
| | | | | 351/159.45 |
| 2009/0168131 | A1 | * | 7/2009 | Yamaguchi ........ G02B 27/0176 |
| | | | | 359/9 |
| 2017/0255018 | A1 | | 9/2017 | Goldstein |
| 2022/0276491 | A1 | * | 9/2022 | Yamaguchi ........ G02B 27/0176 |
| 2024/0001761 | A1 | * | 1/2024 | Dehkordi .......... G02B 27/0103 |
| 2025/0180906 | A1 | * | 6/2025 | Mathur .............. G02B 27/0172 |
| 2025/0264718 | A1 | * | 8/2025 | Song .................. G02B 27/4205 |

FOREIGN PATENT DOCUMENTS

| | | |
|---|---|---|
| CN | 106164746 A | 11/2016 |
| CN | 218630415 U | 3/2023 |
| DE | 4107780 A1 | 9/1992 |
| DE | 20207152 U1 | 8/2002 |
| GB | 460039 A | 1/1937 |
| GB | 2338077 A | 12/1999 |
| JP | H 02205837 A | 8/1990 |
| JP | H 03240020 A | 10/1991 |
| JP | 2016212150 A | 12/2016 |
| KR | 100320991 B1 | 1/2002 |
| SE | 526124 C2 | 7/2005 |
| TW | 201344245 A | 11/2013 |
| WO | WO 9815868 A1 | 4/1998 |
| WO | WO 9821612 A1 | 5/1998 |

* cited by examiner s   Beam Displacement x   Displacement of secondary refraction θ   Angle of incidence between beam and plate normal t   Thickness of plate n   Refractive index of medium $$s = t * sin\theta * \left(1 - \frac{cos\theta}{\sqrt{n^2 - sin^2\theta}}\right)$$

$$x = \frac{t * sin2\theta}{\sqrt{n^2 - sin^2\theta}}$$

GLASSES AUGMENTED PASSIVE DEVICE FOR COMBINING HANDHELD DISPLAY WITH SURROUNDING SCENERY

RELATED APPLICATIONS

This application is a continuation of U.S. application Ser. No. 18/966,478, filed Dec. 3, 2024, titled "Glasses Augmented Passive Device For Combining Handheld Display With Surrounding Scenery," which claims priority to U.S. Provisional Patent Application Ser. No. 63/625,459, filed Jan. 26, 2024, titled "Glasses Augmented Passive Device For Combining Handheld Display With Surrounding Scenery," each of which is incorporated by reference herein in its entirety.

TECHNICAL FIELD

The invention generally pertains to passive optical reflective systems, and more particularly to a reflected system producing an augmented image of a hand-held display device overlaid on the normally viewed scenery.

BACKGROUND

Eye imaging and projection systems are well known in the art. Examples of imaging and projecting systems include a Helmet/Head Mounted Display (HMD), Headset and Augmented Reality (AR) displays glasses. These imaging and projecting systems produce a display image that is either natural or combined with an artificial image generated by an electronic system toward a person's eye. A head-mount display is mounted on a person or any type of head mounting feature, like glasses, attached to the viewer, meaning the display image is overlaid on the normally viewed scenery. The display image appears at a distance from the viewer, as if it is part of the normal scenery within his normal sight. A beam splitter or optical combiner is an optical device (e.g., a semi-transparent mirror), which enables the superimposing, or combining of two images to one.

The prior art requires the use of a powerful image source embedded within HMD system. An optical relay optics is required in order to enhance the viewed image over the high surrounding ambient light during daytime and to image the view to correspond to the outside view distance. Usually special and unique configuration of system parts are required to minimize weight and overhead balance (user weight & balance-within user Center of Gravity (COG)).

The use of such prior art systems requires to integrate the display hardware drivers/controllers and power within the system, which add weight and obviously require additional consideration to system weight & balance.

In prior art HMD, Headset and AR Glasses systems faced several challenges some of the common problems and issues associated with AR glasses are:

Bulky and Uncomfortable: Some AR glasses were bulky and uncomfortable to wear for extended periods. The devices were often heavy, making them inconvenient for everyday use. The design aspects needed improvement to make them more lightweight, stylish, and socially acceptable.

Battery Life & Size: AR glasses required sufficient power to process and display augmented reality content, leading to challenges in battery life. Limited battery capacity and its size could result in shorter usage times and frequent recharging, which may cause user inconvenience, especially in scenarios requiring extended usage.

Cost/value for money: The cost of AR glasses is relatively high, limiting their accessibility to a broader audience. The expense is primarily driven by the complexity of the technology, parts, and the need for miniaturization. Lowering the cost is a crucial factor in encouraging wider adoption.

Content and Application: While there are some AR applications available, the ecosystem of content and applications for AR glasses is not as extensive as that of smartphones. The users are not satisfied with less properties that they are used to have on their today's smartphones and more development of engaging and useful AR experiences required further investment and innovation.

User Interface and Interaction: Developing intuitive and natural user interfaces for AR glasses is a challenge, due the need to have hand operation gestures sensors and application. Design interactions that seamlessly integrate with the real world while providing easy-to-understand controls required careful consideration.

Privacy and Social Acceptance: AR glasses implementation today are bulky and cover most of user face as such prevent philological social brier engaging each other. Moreover, related to social acceptance, such systems equipped with cameras and sensors raised concerns about privacy, as they could capture and transmit personal data without the user's knowledge.

Problems and Issues of Current Situation

One of the most smartphone usages of today's behavior is Missing Socialization and the challenge of losing our human eye contacts with our friends and surrounding. Although we gather socially, we are disconnected, especially if they obstruct the view, less eye contact could limit the ability to convey and interpret non-verbal cues accurately. This could result in miscommunication, misunderstanding, or reduced empathy during social interactions. FIG. 1 shows the use of prior art smartphones and pads that causes missing socialization in today's life.

The challenge or issue associated with smartphone is the potential impact on socialization and face-to-face interactions:

Missing Socialization Opportunities: using smartphones during social meetings may inadvertently hinder face-to-face social interactions. When users may become engrossed in the digital content and lose awareness of their physical surroundings including the people around them. This could lead to reduced social engagement and potentially impact personal relationships and social dynamics.

Social Acceptance and Etiquette: The users might be perceived as disconnected or distracted, making others hesitant to engage in conversation or interact with each other. potentially isolating themselves from the physical environment and the people around them.

The challenge of losing our human eye contacts with our friends and surrounding: Although we gather socially, we are disconnected, if we are able to have them both and share the information within our smart devices while pay attention to our socialization it will beneficial.

Other most smartphones usages of today's behavior are Missing Situation Awareness walking around mostly outside on the street or in public areas while looking at a smartphone and losing situational awareness can lead to a range of problems and potential hazards, including:

Accidents and Collisions: Users might not pay attention to obstacles, other pedestrians, or vehicles, leading to accidental collisions and injuries.

Tripping and Falling: Lack of attention to the ground can result in tripping over curbs, steps, or uneven surfaces, potentially causing injuries.

Pedestrian Safety: Distracted smartphone usage can lead to jaywalking or crossing roads without properly checking for traffic, increasing the risk of accidents.

Theft and Robbery: Being engrossed in their smartphones makes users easy targets for thieves and pickpockets, as they are less aware of their surroundings and personal belongings.

Social Isolation: Focusing on smartphones while walking can reduce social interactions with others, affecting the sense of community and shared public spaces.

Distraction and Inattention: Users may miss important announcements, warnings, or emergency situations, as their attention is diverted to their smartphones.

Health Issues: Constantly looking down at a smartphone can strain the neck, shoulders, and eyes, leading to posture-related problems and digital eye strain.

Traffic Disruptions: Distracted pedestrians can slow down overall pedestrian traffic flow or obstruct others, leading to congestion and frustration.

Inability to Respond to Emergencies: If users are not aware of their surroundings, they might not notice potential dangers or opportunities to help others during emergencies.

Public Nuisance: Distracted smartphone users might unintentionally disrupt others by slowing down pedestrian traffic or causing unnecessary interruptions.

Psychological Impact: Overuse of smartphones in public spaces can contribute to anxiety, stress, and detachment from the immediate environment. FIG. 2 shows how use of smartphones in the public space in today's life causes missing awareness to the situation.

To address these issues, smartphone users may use an advanced device which can bring the smartphone display over the user's normal sight which will enhance safe smartphone usage in public areas. This includes enhanced mindful of their surroundings, and may further reduce the risks associated with distracted walking.

Other most concerns of using a smartphone and head down devices while driving can significantly impact a driver's situation awareness and pose various risks, considerations, and potential hazards, which includes:

Visual Distraction: Engaging with a smartphone requires the driver to divert their attention away from the road, resulting in visual distraction. Looking at the screen for even a few seconds can cause drivers to miss important visual cues and hazards on the road, increasing the risk of accidents. However, research has shown that humans are not efficient at multitasking, and attempting to do so can lead to decreased performance in both tasks.

Cognitive Distraction: Interacting with a smartphone involves cognitive engagement, diverting the driver's mental focus away from the driving task. This can lead to a decrease in situational awareness as drivers become less attentive to their surroundings, traffic conditions, and potential hazards.

Manual Distraction: Physically manipulating a smartphone, such as typing, swiping, or holding the device, can lead to manual distraction. Drivers may take their hands off the steering wheel, reducing their ability to respond quickly and effectively to sudden events on the road.

Reduced Perception and Response: When using a smartphone, drivers may experience attention distribution following slower reaction times and impaired perception of events happening on the road. This can hinder their ability to anticipate and respond appropriately to changes in traffic or potential dangers.

Tunnel Vision: Focusing on the smartphone screen can create a "tunnel vision" effect, where drivers become fixated on the device and lose awareness of their peripheral vision. This restricts their ability to scan the environment for potential hazards and increases the chances of missing critical information.

Decreased Situational Awareness: Overall, using a smartphone while driving can lead to a decrease in overall situational awareness. Drivers might miss important visual and auditory cues, such as traffic signals, pedestrians, or sirens, which are essential for making informed decisions on the road. FIG. 3 illustrates how a driver with a head down look concentrating on his smartphone misses an essential road situation awareness.

To ensure maximum situational awareness and promote safe driving, it is important for drivers to prioritize keeping their focus on the road and adopt hands-free communication options or use a device that can bring the smartphone or other head down devices information or display to driver outside sight.

A search of the prior art includes a search on near to eye periscopes/glasses did not disclose any literature or patents that read directly on the claims of the instant invention. However, the following U.S. patents are considered related:

| PAT. NO. | INVENTOR | ISSUED |
|---|---|---|
| 2,255,197 | R. E. Thomas | 9 Sep. 1941 |
| 2,570,718 | Joha E. Rooney | 9 Oct. 1951 |

The U.S. Pat. No. 2,255,197 patent discloses a system that attaches a prism/periscope on eyewear glasses as such redirecting the viewer line of sight (LOS) up or to the side. The size of the said prism/periscope does not have any benefit to the viewer when looking ahead, the diversion of the viewer LOS is minor compared to the long-distance scenery vision. Moreover, the patent does not combine two images as disclosed in invention disclosed herein.

The U.S. Pat. No. 2,570,718 patent discloses an eye-glasses system with additional optic character mostly used for reading or other close vision. The additional optical element with its mounting configuration allows the user to look up for a long-distance scenery vision or look down for close vision. The patent does not combine the two images as one, as augmented vision. In addition, in order to look rapidly over down\up sights the user shall suffer from high fatigue due to eye movement and focal adjustment.

The U.S. Pat. No. 6,577,411 patent discloses a bifocal eye-glasses system for alternative or simultaneous direction of light originating from two scenes to the eye of a viewer that allows the wearer to see both a close-up scene and a distant scene at the same time. The system comprises two focal lenses being positioned aside one another in front of one of the eyes of the viewer.

For background purposes and indicative of the art to which the invention relates, reference may be made to the following remaining patents found in the patent search.

| PAT. NO. | INVENTOR | ISSUED |
|---|---|---|
| U.S. Pat. No. 6,761,450 B1 | Richard Baum | Jul. 13, 2004 |
| U.S. Pat. No. 3,495,898 | Makeup Eyeglass | Mar. 23, 1967 |
| U.S. Pat. No. 6,577,411 | Yair David | Jun. 10, 2003 |

An additional search reveals a prior art commercial product known as "Lazy Glasses" (see FIG. 4) used as a periscope and allows the user to read in bed or watch TV while lying flat on your back. The Lazy Glasses direct the viewer's sight downwards by 90-degree angle, These Lazy Glasses protect the neck, head and eyes and prevent neck cramps, head movement and eye strain. The lazy glasses can be worn over prescription glasses.

The "Lazy Glasses" product is just directing the viewer vision by 90-degree, and is unable to superimpose two viewing directions and correct its focal distances. The "Lazy Glasses" product can be used only in a static position due to vision disorientation, distance, size error, and misleading view. The prism glasses can be worn only on regular glasses. No IPD adjustment is available. Diffractive Optical Elements (DOEs) are passive surface optical devices that redirect and focus light through the division and mutual interference of a propagating electromagnetic wave (light). This contrasts with refractive elements, which redirect and focus light through variations in indices of refraction.

A Holographic Optical Element (HOE) is a surface optical component (mirror, lens, directional diffuser, etc.) that produces holographic images using principles of diffraction. HOE is most commonly used in transparent displays, 3D imaging, and certain scanning technologies. The shape and structure of the HOE is dependent on the piece of hardware it is needed for. The coupled wave theory is a common tool used to calculate the diffraction efficiency or grating volume that helps with the design of an HOE. The HOE is also used in the development of augmented reality (AR) by companies such as Google with Google Glass or in research universities that look to utilize HOEs to create 3D imaging without the use of eye-wear or head-wear.

Meta Optical Elements (MOE) Metalenses are a radical new flat lens technology, custom-made, that can disrupt optics and manipulate incident light used in various thin film technologies at the level of the "meta-atom" a nanoscale structures pattern, modifies the phase profile of the incident light beam, causing the beam to be bent (redirected). The Meta-atoms are tiny with varying shapes and sizes whose position across the lens can be arbitrary and are designed to control the interaction of light like a traditional lens.

A Metalens employs a subwavelength "meta-atom" pattern on a dielectric surface. Specifically, Meta-atoms are tiny, with varying shapes and sizes whose position across the lens can be arbitrary and are designed to control the interaction of light. The "lens" in metalens implies these components are used for focusing light like a traditional lens.

In view of the above disclosure, the primary objects of the invention is to produce an improved system for producing an AR display image over a user normal ahead sight by a passive optical device that has the following characteristics:

Superior AR glasses with superior properties over the current AR devices.

Taking advantage of the most hand-held mobile users with minimal impacts.

Lightweight Passive Augmented add-on for most of prescription glasses and sun glasses.

Encourage safe use of today hand-held mobile users.

Enhance Situation Awareness in use of smartphones and pads in today's life.

Improved Socialization engagements—maintaining human eye contact in today's life.

Supports variety of human's ergonomics (e.g., head movement, viewer height/position, IPD (Interpupillary Distance), Field of Regards.

Low cost and affordable to any user.

Simple common onetime personal setting.

Attached to most standard eyeglass frame ("clip on" or embedded in the glasses).

One hand device docking position—"flip" position.

Operates well when in walking motion while using hand-held display such as a smartphone.

Eliminates the use of expensive and complex optical relay and complex hardware elements as currently used in prior art designs.

Easy to use when all the display, applications, and hand gestures remain when using the handheld device.

Can be sold as a user-installed kit, monocular, binocular product, and is cost effective from both a manufacturer and consumer point of view.

Embedded element within the glass lens into other AR glasses that do not use a specific display device like "Ray-Ban Meta" smart glasses or Amazon "Echo Frames" and more.

It is, therefore, an object of the present invention to provide a device that superimposes a smartphone screen view over a scenery view while keeping the user's view straight ahead.

It is yet another object of the present invention to provide a device in which such superposition of views is made with combinations of optical parts without using other means for combining the two views.

It is yet another object of the present invention that such a device is a stand-alone device that is mounted over regular eyeglasses or embedded into or lithographed over eyeglasses or means for vision display.

These and other objects and advantages of the present invention will become apparent from the subsequent detailed description of the preferred embodiment and the appended claims taken in conjunction with the accompanying drawings.

SUMMARY

The Glasses Augmented Passive Device 4 of the present invention may comprise all or part of the following elements:

1. A prism optical device 4.1—an optical combiner device with a semitransparent combiner coating 6, dichroic, wire-grid type or a polarizer and/or other surface material implementation and/or surface with a variety of related properties, which combines/superimposes images coming from different directions.

2. Optical power element 4.3 or 5.1 embedded into and/or attached within the device 4, joins the optical focal distances of the said images such as a display of a handheld device 3 and the surrounding world scenery 2.

3. A reflective surface 5 that uses to divert ray light towards the desired direction within the Glasses Augmented Passive Device. It is also used to flip/reverse the said ray light image and align it with the second image.

4. The alternative implementation of the Glasses Augmented Passive Device 4 is by surface optics, Thin Film technology such as HOE, DOE, FOT, MOE technologies in which the optical properties of the said elements are almost the same with minimal volume/size impact.

5. Fresnel Optic Technology (FOT) is referring to a series of grooves etched on the waveguide substrate. Their thin, lightweight construction, minimizes the standard optical element volume but keeps its fundamental optic properties. This technology is mostly implemented on lenses, prisms, and combiners.

6. Optical Elements within Glasses Augmented Passive Device is also using an Anti-Reflective surface that uses to reduce stray undesired light within the device or shining over the openings of the Glasses Augmented Passive Device. None of the optical surfaces, like the left and right sides of the device, may be coated with opaque paint/coating to avoid undesired straylight within the system.

7. Additional elements that may be added to the Device (System) for full usable product:

7.1 Eye glasses frame 8—The Device may be mounted over prescription glass or an open frame with any attachment mechanism known in the art including a fix attachment.

7.2 "Clip-on" mechanism 9 may be used with additional personal settings and "flip" side/up stow mechanism 10 for easy personal adjustments.

7.3 A fix or adjustable Beam Displacement Element 11 may be added for more image combination.

7.4 An optical shutter 4.4 may be added over a Plano spherical lens 4.3 and give the system an option to close the handheld display 3 optical pass instead of the "flip" option. The optical shutter comprises a variety of technical means known in the art like mechanical, polarizers, electronic, dichroic, light sensitive and more.

It should be noted that the terms Glasses Augmented Passive Device or/and optical device or/and "Optical Block" or/and the device of the present invention and/or Passive AR Optical Device with or without the reference to item 4 are related to the embodiments of the invention described herein.

A short paragraph explaining in what the invention is/does.

In accordance with some implementations, . . . . INDE-PENDENT CLAIMS

In accordance with some implementations, a method is performed at a computing device having memory and one or more processors. The method includes: . . .

In accordance with some implementations, a computer-readable storage medium includes a . . .

In some implementations, a computing device includes one or more processors, memory, a display, and one or more programs stored in the memory. The programs are config-ured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

In various circumstances, the (INVENTION/SYSTEM) of the present disclosure has the following advantages over conventional XXX systems. First, in accordance with some implementations, WHAT ARE THE ADVANTAGES OF THIS INVENTION?

Thus, methods and systems are disclosed for (INVEN-TION). Such methods and systems may complement or replace conventional methods and systems of (FIELD).

Figure 1:
FIG. 1 shows prior art smartphones and pads usage Missing Socialization in Today's life.
Figure 2:
FIG. 2 shows prior art smartphones and pads usage Missing Situation Awareness in Today's life.
Figure 3:
FIG. 3 illustrates head down driver look and usage Missing Road Situation Awareness.
Figure 4:
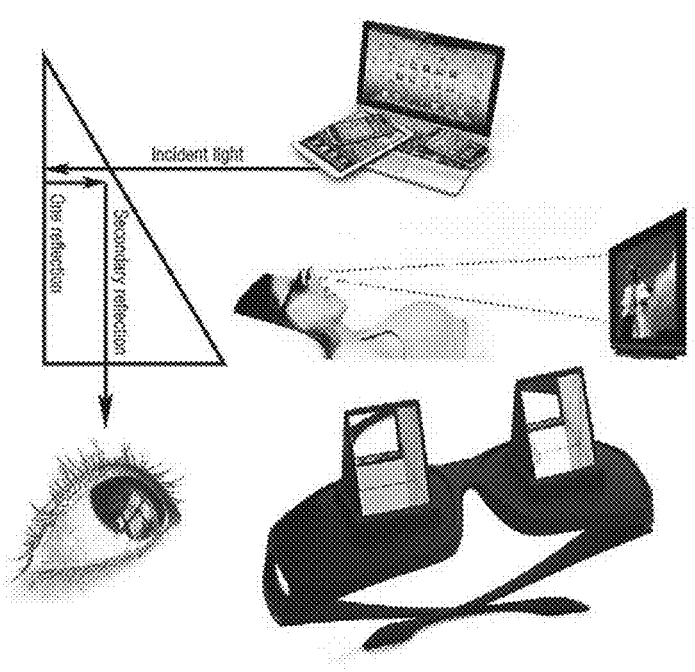
FIG. 4 illustrates prior art "Lazy Glasses"-periscope glasses that direct the viewer sight by 90-degree.

Reference will now be made to implementations, examples of which are illustrated in the accompanying drawings. In the following description, numerous specific details are set forth in order to provide a thorough under-standing of the present invention. However, it will be apparent to one of ordinary skill in the art that the present invention may be practiced without requiring these specific details.

Description of Implementations

LIST OF REFERENCE NUMBERS

1—Viewer Eye

2—Outside Scenery, world scenery

3—Handheld display device

4—Innovative Passive Augmented Device, "Optical Block", "Cubic Prism Optical Device"

(Optical Device or surface optic technology implemented within Wave Guide Plate)

4.1—Beam splitter or optical combiner
4.2—Optical wedge
4.3—Plano Spheric Lens, optical power element
4.4—Optical shutter
5—Reflective surface/mirror
5.1—Optical power element
6—Combiner surface, coating
6.1—Anti-Reflective (AR) surface
6.2—Opaque paint/coating
7—Personal vision correction lens
8—Eye glasses frame
9—Device mounting mechanism—"Clip-on"
10—"Snap" Mechanism
11—Beam Displacement Element Imaging systems display visual information, either natural or artificial (generated by an electronic system), toward the human eye. HMD, Headset and AR display glasses are types of imaging systems that display an image on a semi-transparent medium, such that the displayed image is combined on the scenery viewed through the transparent medium.

Current Near to Eye Periscope are limited to handheld device/book head down and divert eye vision sight without the ability to superimpose it with the head up sight. Nevertheless, it adjusts the inherent focal distance of each object.

Figure 5:
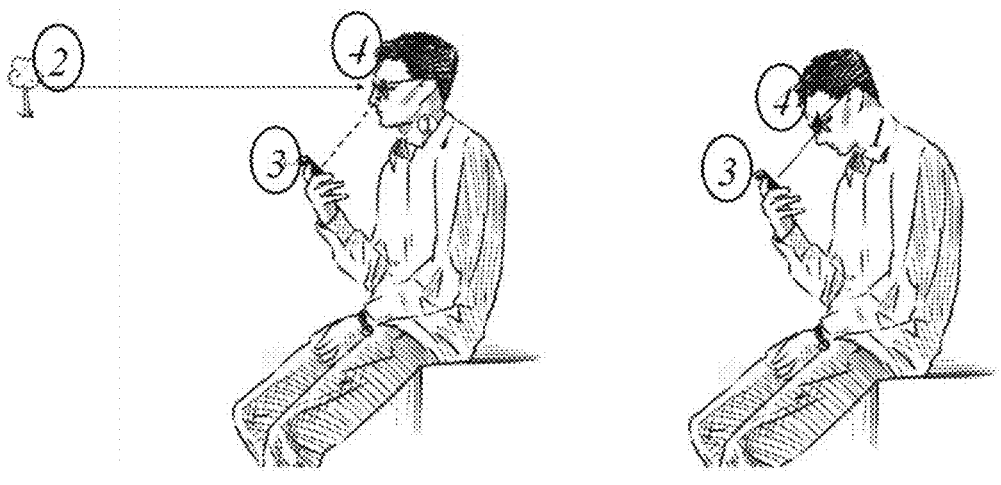
FIG. 5 illustrates an aspect the innovative Passive AR Optical Device of the present invention.

Current HMD, Headset, AR Glasses, and AR display systems suffers from weight, COG, and size increase, over-burdening the user's head and carry impact due to all system elements including power source. As discussed in the prior art disclosure above, beyond the technical and technology issues the major issue is the human behavior and ability to adapt to a convenient and easy to use device. As illustrated in FIG. 5, current smartphone/tablet 3 users prefer to look down at their handheld device, use the touchscreen as needed, while losing their surrounding awareness 2. The innovative Passive Augmented Device 4 of the present invention provides enhanced surround visibility while displaying personal handheld display information shown on the smartphone and tablet displays. A further objective of the improvement is to provide safety (surrounding awareness) and cost saving by utilizing head down sight within normal direct forward human sight.

One or more aspects of this improved device system over enhancing the viewer's situational awareness is by displaying desired information and sensitive data while keeping eye contact within surround members and surround awareness, such as real-time crucial data during meeting/negotiation, navigation, important massages, etc. Since the system is based on passive optical parts no power or support hardware are needed as such the innovative device system is a lightweight, affordable for each type of a handheld device, compact to be worn and simple to use. The device of the present invention may be worn over a monocular or binocular optical system and its mounting mechanism allows it to be attached to commonly used glasses with a frame attachment. Further, a one hand feature allows device "Flip" up/side position if a clear vision is needed. Moreover, this device may be used as a "Clip-on" over sunglasses or clear glasses if a vision correction is not needed by the user. The "Clip-on" device is configured to have an adjustment mechanism for the central eye pupil and IPD (Interpupillary Distance) personal settings.

Figure 6:
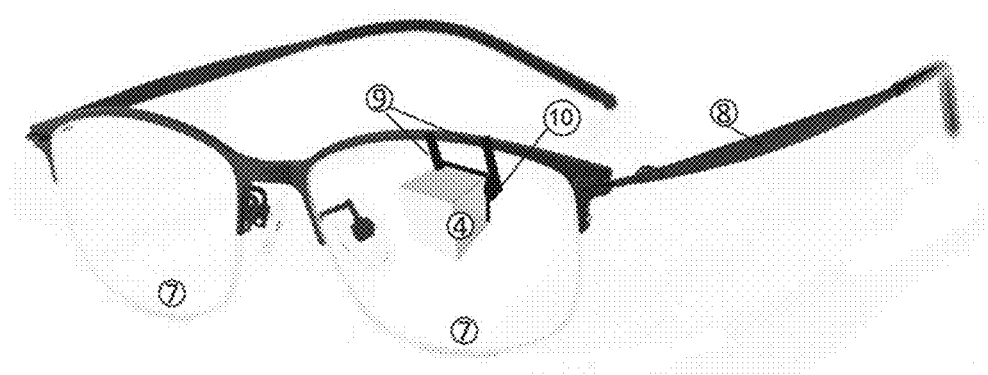
FIG. 6 illustrates another aspect of the innovative Passive AR Optical Device of the present invention.

The advantage of the device of the present invention over the prior art is that the most common use of handheld display devices is at an angle of about 20 to 30 degrees from the normal relative a plane horizontally oriented to the user's body, see element 3 in FIG. 5. As such the user is in a head down posture concentrated on his display interest and loses contact and communication with his surroundings. The alternative is to use an AR glass and bear the size, weight and discomfort of walking outdoor with such a device not considering the energy time limit and cost. The device of the present invention is a passive eye glasses worn optical device, see element 4 in FIG. 5, mounted on any standard glasses frame, see FIG. 17, element 8, or sunglasses with his personal vision correction lens, see element 7 in FIGS. 6, 17. For a user that does not need a vision correction, the glasses frame 8 may be used as a support device holder, with or without the passive front glass 7. The user may also use this device on his sunglasses. The device of the present invention comprises a mounting mechanism, see FIG. 6, element 9, allows "snap" "Clip-on" over the glasses frame 8 as shown in FIG. 6, or other mount mechanism known in the art. The device of the present invention may comprise a "flip" mechanism within the "Clip-on", FIG. 6, element 10, allows the user to move or side/up stow location of the optical system device 4 away from the viewer Line of Sight (LOS) for clear undisturbed normal vision. As mentioned above, within the device attachment mechanism 10 a center pupil and IPD adjustment provision is provided. Within a prism optical device 4 an optical power element, see element 4.3 in FIG. 12 or element 5.1 in FIG. 9, may be provided to enable a same optical focal distance for a handheld device 3 and world scenery 2.

The device of the present invention enhances a user's safety as, in walking and using smartphone for example, the user can see the information and read navigation information while looking ahead and maintaining visual contact with the road and traffic ahead. Moreover, the device of the present invention may be used while driving, when keeping driver's sight on the road and traffic ahead while watching the screen of the smartphone 3 attached to the car dashboard at a fixed position and car instrumentations see 3.1 in FIG. 7. As a result, image\information is superimposed on the user's outside vision. The device of the present invention enhances a driver's safety as he keeps his attention to the surrounding and road situation. Such a device eliminates the use of car expensive devices and enables continued use in/our car usage.

Figure 7:
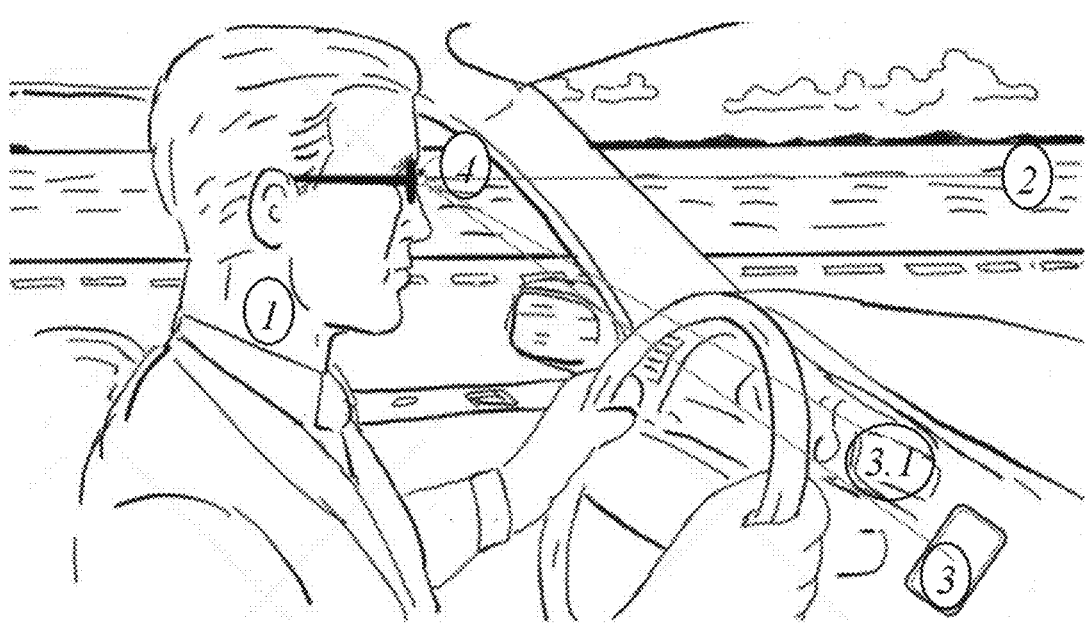
FIG. 7 illustrates another aspect of the Innovate Passive AR Optical Device of the present invention.

Note: whenever "Smartphone", Display Device, Handheld Device, etc. are used, they refer to any type of device with an image display that may be superimpose or combined with a device for outside scenery vision, as illustrated in FIG. 7, elements 3 and 3.1.

Figure 8:
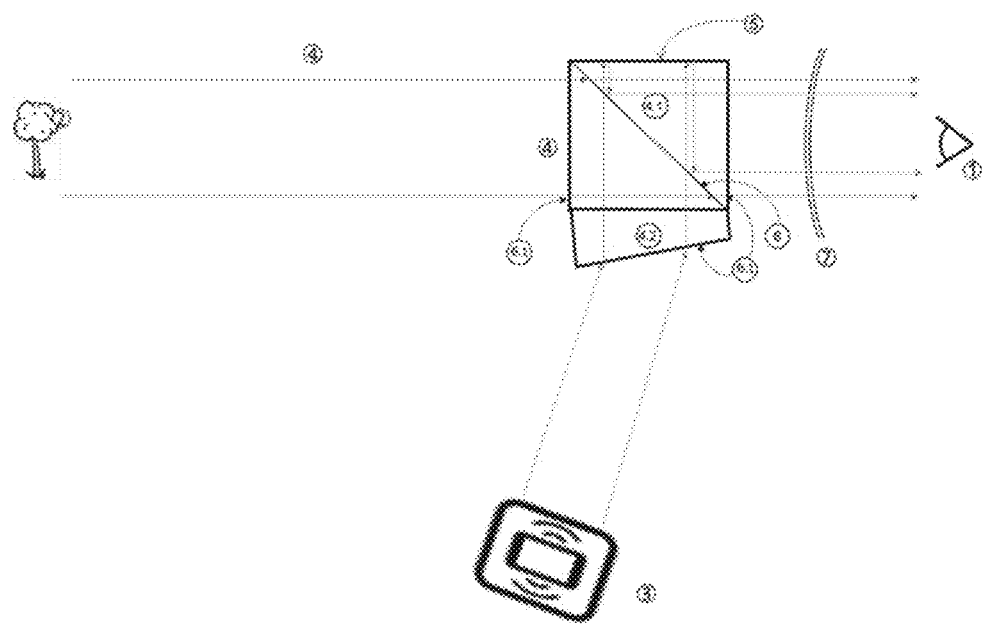
FIG. 8 illustrates a Prism Optical Device Basic Innovation Layout

In one particular embodiment, the device of the present invention comprises a basic layout with a Prism Optical Device as illustrated in FIG. 8. The smartphone/display image 3 appears in a distance from the viewer, as if the user looks down within part of the direct normal scenery 2. One surface 6 within the Prism Optical Device 4 has a beam splitter or optical combiner 4.1 with a special coating 6 e.g., a semi-transparent mirror, which enables the superimposing of two images one on the other or combining them into one. The handheld display unit 3 transfers the image through an optical wedge 4.2 that moves the image to the combiner at an angle in order to compensate for the handheld angle of the smartphone/display image 3. The aligned smartphone/display image 3 hits the combiner's surface 6 and reflects-back by the reflective coating/mirror 5 and back again to the combiner's surface 6, which is the second (inner) surface of the combiner at the side that faces the user's eye 1.

In this optic configuration the smartphone/display image 3 must be reflected twice in order to have the smartphone/display image 3 appear in the proper alignment with the surrounding vision 2. As such, the reflective surface 5 reflects almost all the image energy back to the combiner, and then back to the viewer's eye. In addition, the reflective surface 5 has a spherical radius 5.1 (see FIG. 9) that corrects the focal distance of the display image to the outside scenery 2.

The user may use his optical correction glasses 7 as he may see fit, without any adjustment. The "clip-on" mechanism 9 may be used with additional personal settings and "flip-up" mechanism 10 as shown in FIG. 6.

The basic arrangement of the optical design with the Prism solution of the present invention is illustrated in FIG. 8 that shows the optical ray tracing of the device with the arrangement of optical components described above. In such a configuration (FIGS. 8 and 9) the user needs to adapt his view to the different distances of the smartphone/handheld display versus the surrounding as he does regularly. This issue is solved by adding an optical power 5.1 to surface 5. As such the smartphone/handheld display 3 will appear at the "Infinity" with the same optical distance as the outside scenery 2. This configuration of the device is illustrated in FIG. 10.

In one embodiment, the optical device 4 of the present invention contains sub-elements 4.1, 4.2, 6 and 5 with or without the optical focal correction 5.1 that may be made as one optical device ("Optical Block"/"Cubic Prism") with a proper Anti Reflective coating 6.1 over its optical surfaces. The left and right sides may be coated with opaque paint/ coating 6.2 avoiding undesired straylight within the system.

Figure 10:
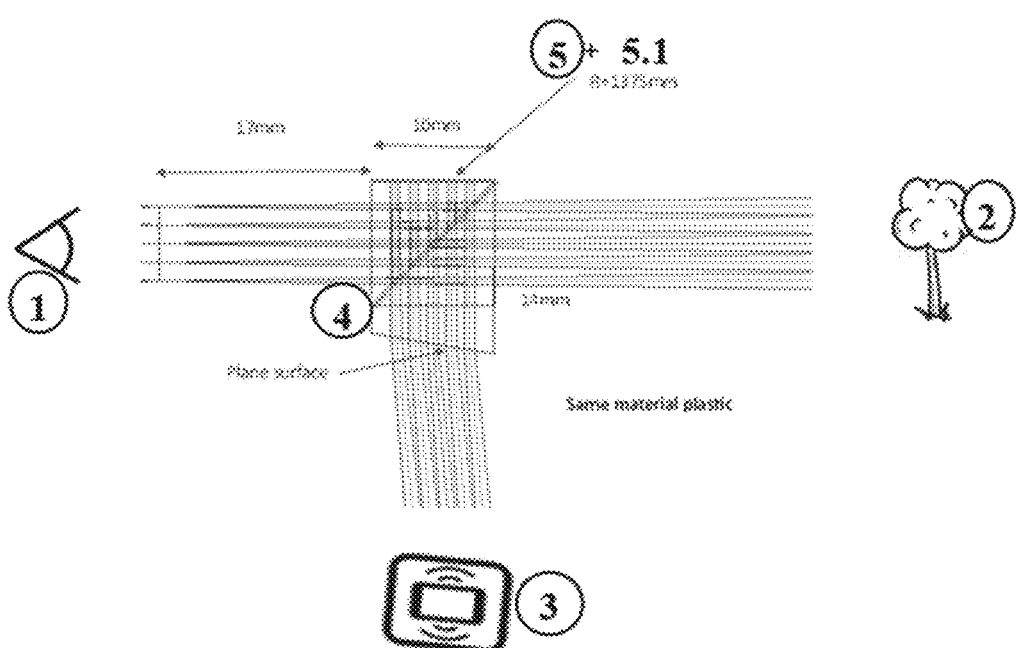
FIG. 10 illustrates a prism Distance Matching Optical Device Innovation Optic Ray Tracing of the present inven-tion.

Another basic embodiment of the present invention is illustrated in FIG. 10. The optical device 4 is based on a linear cubic combiner 4.1 that superimposes the outside scenery with the display image/smartphone 3 through the optical wedge or wedge prism 4.2 in a convenient viewing angle that directs it in line with a normal hand holding position of a display image/smartphone 3.

The display image/smartphone 3 is transferred through the semi-transparent combiner surface 6 with an appropriate higher amount of visibility/intensity relative that of the outside scenery 2 to the viewer's eye 1. The user may use a corrective eyewear glass 7 for best personal vision. The handheld device/smartphone/display angle alignment is obtained by the optical wedge 4.2, which is normally about 20-30 degrees relative the normal.

The semi-transparent mirror 6 may be based on a wide range of modern thin films, coating methods, multi-layers, dielectric, PVD, ALD etc., which are well-established in the optic industry. The coating technologies establish the optimal reflection/transmission for each viewing pass while keeping the lowest color distortion for enhanced perception with the proper Bandpass and Bandstop for each one. The combiner reflection/transmission magnitude may be adjusted according to the preferred optical pass for the particular device.

Thin film coatings may be used over the opening viewing pass, see 6.1 in FIG. 10, with Anti Reflective coatings to minimize the glare and undesired reflections or parasitic emissions within the device. A highly absorbing or opaque coating may be applied over the sides of the opening viewing pass 6.1 to block external irrelevant lights and internal undesired reflections. Most of the mobile phone/ display 3 use a AMLCD display panel technology, which is based on polarized phenomena such as the semi-transparent polarized mirror 6. This mirror 6 may be aligned with the same display polarity to achieve the best light efficiency towards the optical device prism 4.

Another embodiment of the polarizing mirror 6 is based on the principle of thin-film linear polarizers as well as Glan-type, wire-grid type polarizers that are also easier to utilize and integrate better relative to the Brewster-based polarizers that require special and more stringent angles and thickness of the optical medium that they use as a semi-reflective surface.

It is well understood that the nature of a polarizing surface is its direction. As such it is desired to have a rotation mechanism for the mirror 6 for best performance. In some cases a material such as a self-adhesive film can be used that can be attached by the user in the setup process.

Figure 11:
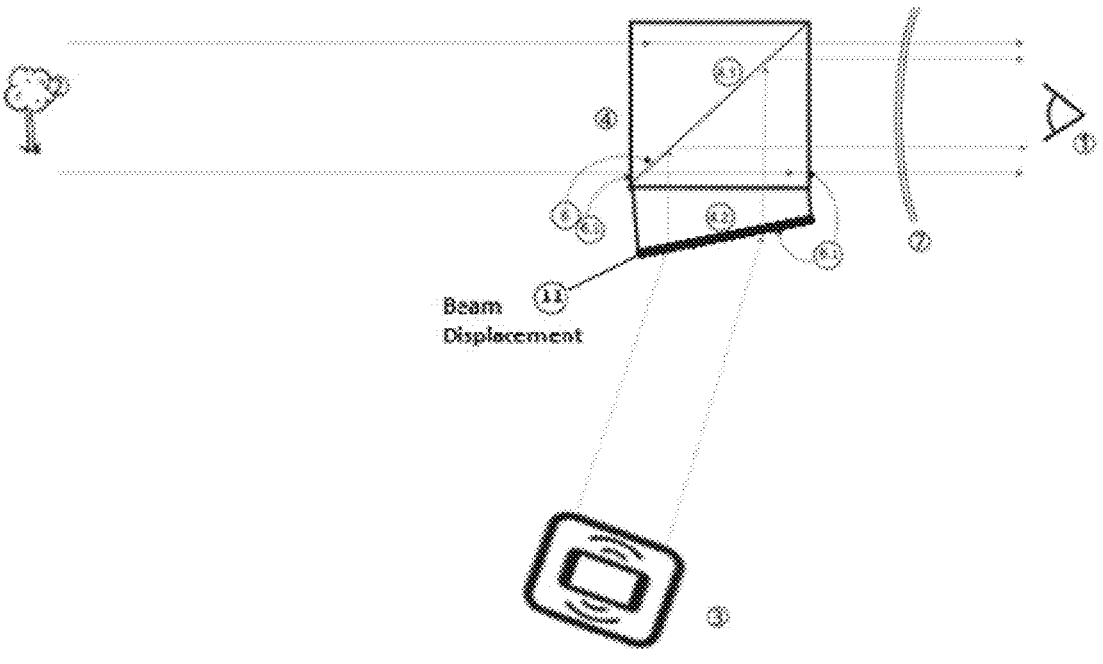
FIG. 11 illustrates a Cubic Prism Optical Device Basic Innovation Layout with high preference pass for the smart-phone of the present invention.
Figure 12:
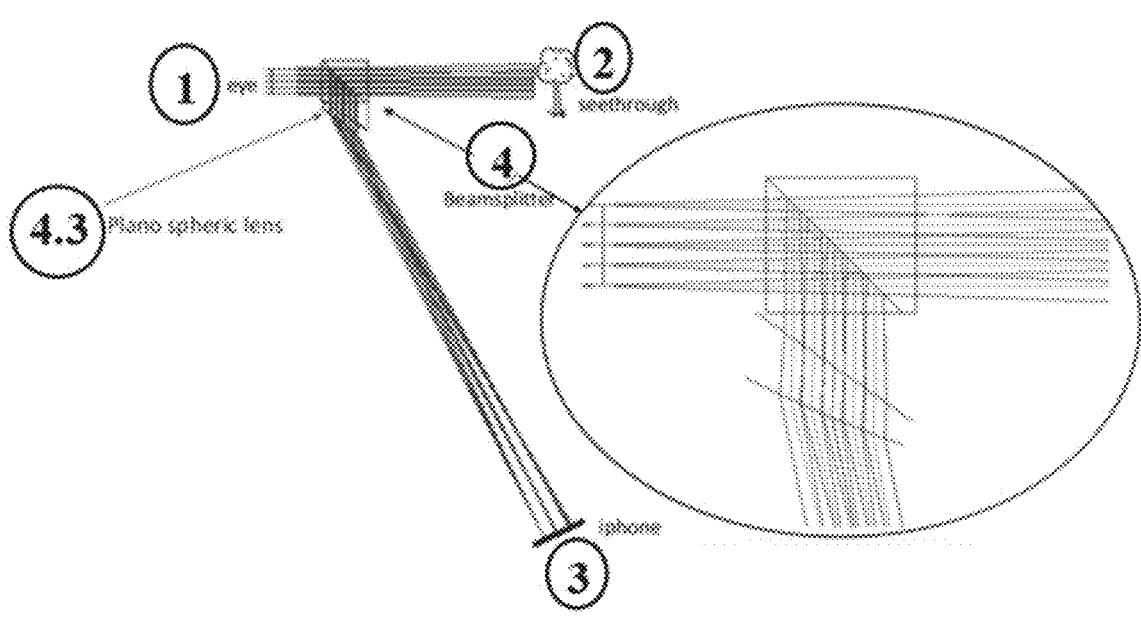
FIG. 12 illustrates an aspect of the Innovative Passive Augmented Glasses Configuration Ray Tracing with pre-ferred Smartphone (3) brightness pass.

An optical configuration with ray tracing of the Passive Augmented Glasses of the present invention is illustrated in FIG. 12, in which the brightness of the smartphone display 3 masks that of the surrounding scenery 2. To minimize the brightness coming from the reflection surfaces with the optical arrangement in FIG. 11, the smartphone 3 image passes only once through the combiner 6 with the proper ratio relative that of the optical pass of the surrounding scenery 2. The smartphone display 3 is corrected for matching the focal distance to that of the surrounding scenery 2 with a Plano Spheric Lens 4.3 that reflects back from the Beam-splitter/combiner surface 6.

This configuration is able to get at least 50% or more of the smartphone light to the eye while the light of the surrounding scenery is 50% and less. This ratio between the brightness percentages of the display and surroundings is related to the beam splitter surface coating properties 6. The only issue of this configuration is that the smartphone image shall appear at the user's sight upside down, and this can be adjusted with a smartphone screen application. Overcoming this approach and still having the smartphone preferred light efficiency, we need to establish a second reflection surface at this light pass. This is obtained with the arrangement of optical parts illustrated in FIG. 13.

The mirror surface 5 reflects the image ray on the smartphone display 3 after it is focally corrected by a Plano spherical lens 4.3 and then reflected by the beam splitter 4 with beam splitter surface coating properties 6. The common human preference of reflective glasses is to get a clear and hi-bright image. As such, the semi-reflection beam splitter coating 6 has about 60-70% transmission relative the transmission of the surrounding which is about 30-40% as commonly used by sunglasses. The optical configuration of the present invention can further have an optical shutter 4.4 over the Plano spherical lens 4.3, which gives the system an option to close the handheld display 3 optical pass instead of the "flip" option. The optical shutter can be provided with a variety of technologies known in the art like mechanical, polarized, electronic, dichroic, light sensitive and more.

Figure 14:
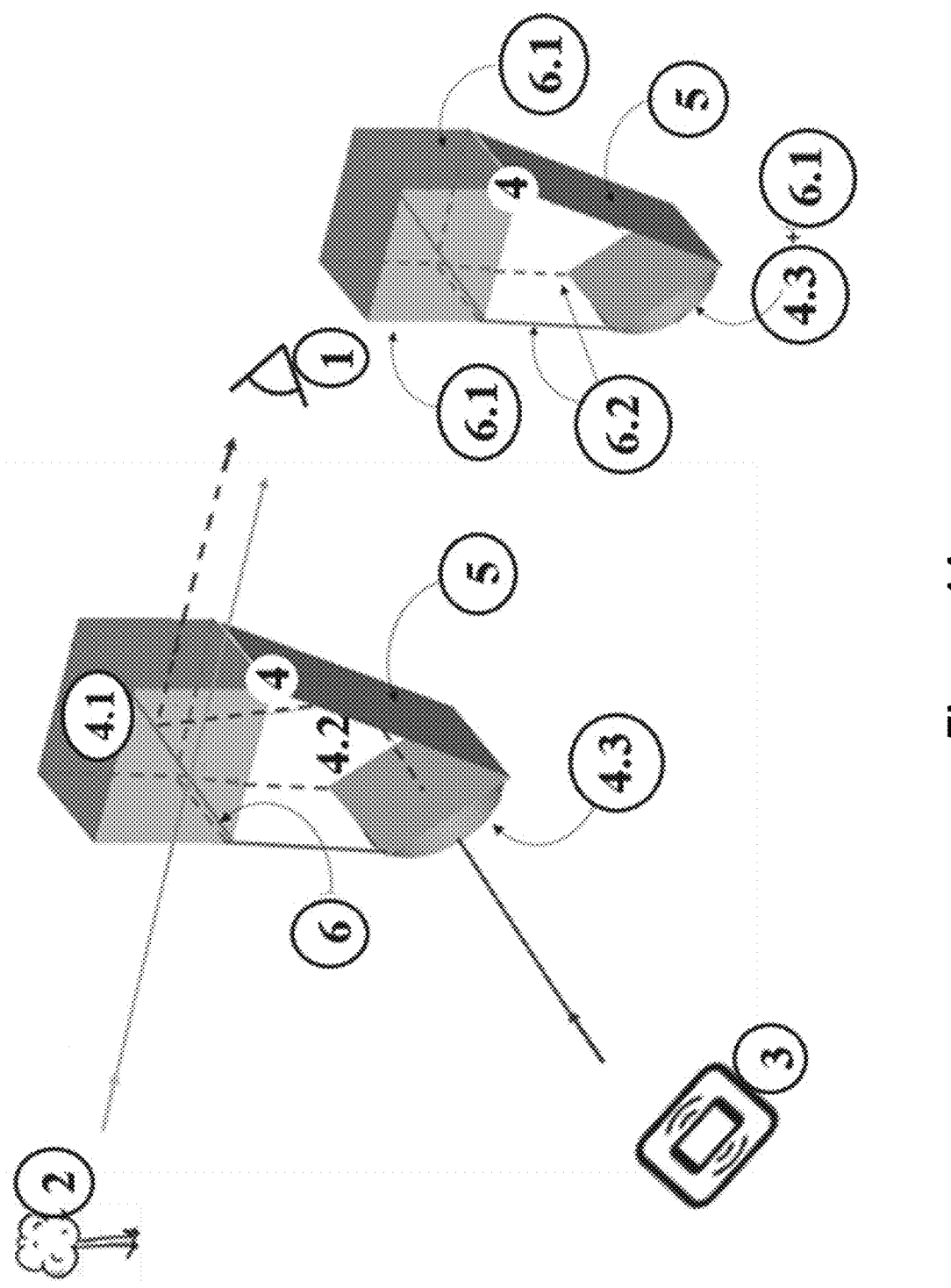
FIG. 14 illustrates an Advanced Innovative Passive Aug-mented Glasses Device.

The device of the present invention may be fabricated in a single Optical Block, by molding, Diamond Turning, combining elements, or assembled elements using basic optic parts and elements as illustrated in FIG. 14. The device is coated with the relevant surface coatings, reflective 5, semi-reflective 6, black coatings/paint on the sides 6.2, and Anti-Reflective at the eye sight, outside scenery and smartphone surfaces 6.1. It is well known that partial and/or selective coatings may be applied for optimization, performance and cost.

The device of the present invention may be attached to any user dominant eye (left or right) or used for binocular vision with a pair of devices. For such a pair of devices the "clip" on and "flip" mechanisms shall be modular to be adjusted according to the user preference and needs. For a binocular vision, an IPD (Interpupillary Distance) and indi-
vidual line-of-sight (LOS), adjustment mechanisms shall be
applied as well.

Figure 15:
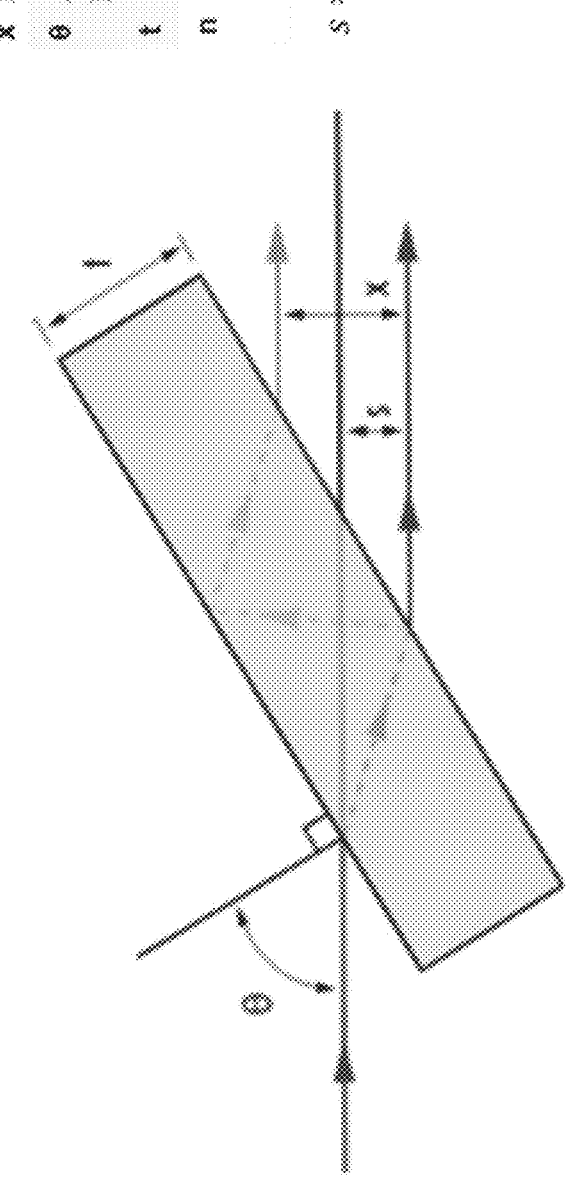
FIG. 15 illustrates a Basic Solution for Beam Displace-ment Element

An additional capability which can be part of the device
of the present invention is provided by an additional element
at the image pass (Smartphone display 3 or outside scenery
2). This additional element is a Beam Displacement element
which can adjust the operating angle between the two
images. This element or similar elements are well known in
the art, and for the purposes of the device of the present
invention it is usually used at parallel light passage for each
image as illustrated in FIG. 15.

Another implementation of the Passive Glasses Aug-
mented Device of the present invention is using surface
optic technologies, Thin-Film and\or Diffractive optical elements (DOE) and/or Holographic optical element (HOE)
and\or Meta Optical Elements (MOE) with a custom-made
surface optical technologies that incorporate the basic ele-
ment properties of the said Passive Glasses Augmented
Device using this type of surface optic or mix of the said
technologies. These surface optic technologies are imple-
mented within a Wave Guide Plate or glass substrate or even
within the eyeglass lens 7.

Figure 16:
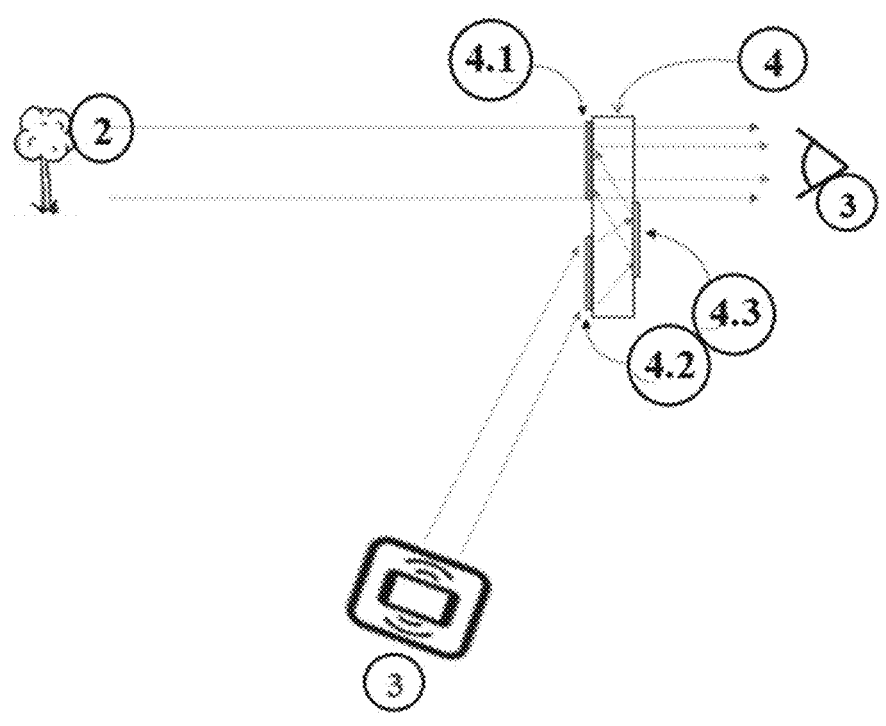
FIG. 16 illustrates an Advanced Innovative Passive Aug-mented Glasses Configuration basic implementation by sur-face optic technologies.

The illustration in FIG. 16 shows how the basic elements
of the Passive Glasses Augmented Device are implemented
within a Wave Guide Plate 4 or eyeglass lens 7. The
Surface/Diffractive/Holographic optical element 4.1 acts as
a ray combiner of the outside scenery 2 and the smartphone
display 3 with its ray image passing through the said wave
guide. The second Surface/Diffractive/Holographic optical
element or optical wedge 4.2 acts as a Beam Displacement
Element with a Plano spherical lens 4.3. as such the other
surface optical element like the focal image correction
lens/optical element 4.3 may be incorporated within the
Wave Guide Plate or glass substrate to present both visions,
i.e., outside scenery 2 and smartphone image 3, at the same
focal distance for comfortable eye sight. As described
herein, the optical shutter may be added in this configura-
tion.

Although such as implementation embedded within user
optical correction glasses 7 requires a precise location within
viewer center of vision, it can be implemented quite easily
with a prescription glasses process. For other users or
sunglasses users, such a device can be attached to the lens
external surface, see FIG. 17.

The implementation of Passive Glasses Augmented
Device with thin film\surface optic elements embedded
within the glass lens can be attached or embedded into other
AR glasses that do not use a specific display device like
"Ray-Ban Meta" smart glasses or Amazon "Echo Frames"
and more.

It should be noted that the reflective surface 5 coatings or
reflective element directing an image to its proper direction
is an inherited element within the Wave Guide Plate 4. This
is because as the light passes within it, it is "trapped" and
"bounced" inside. This technology allows several reflections
within a wave guide, and as such the surface optical ele-
ments have a flexible structure.

Figure 18:
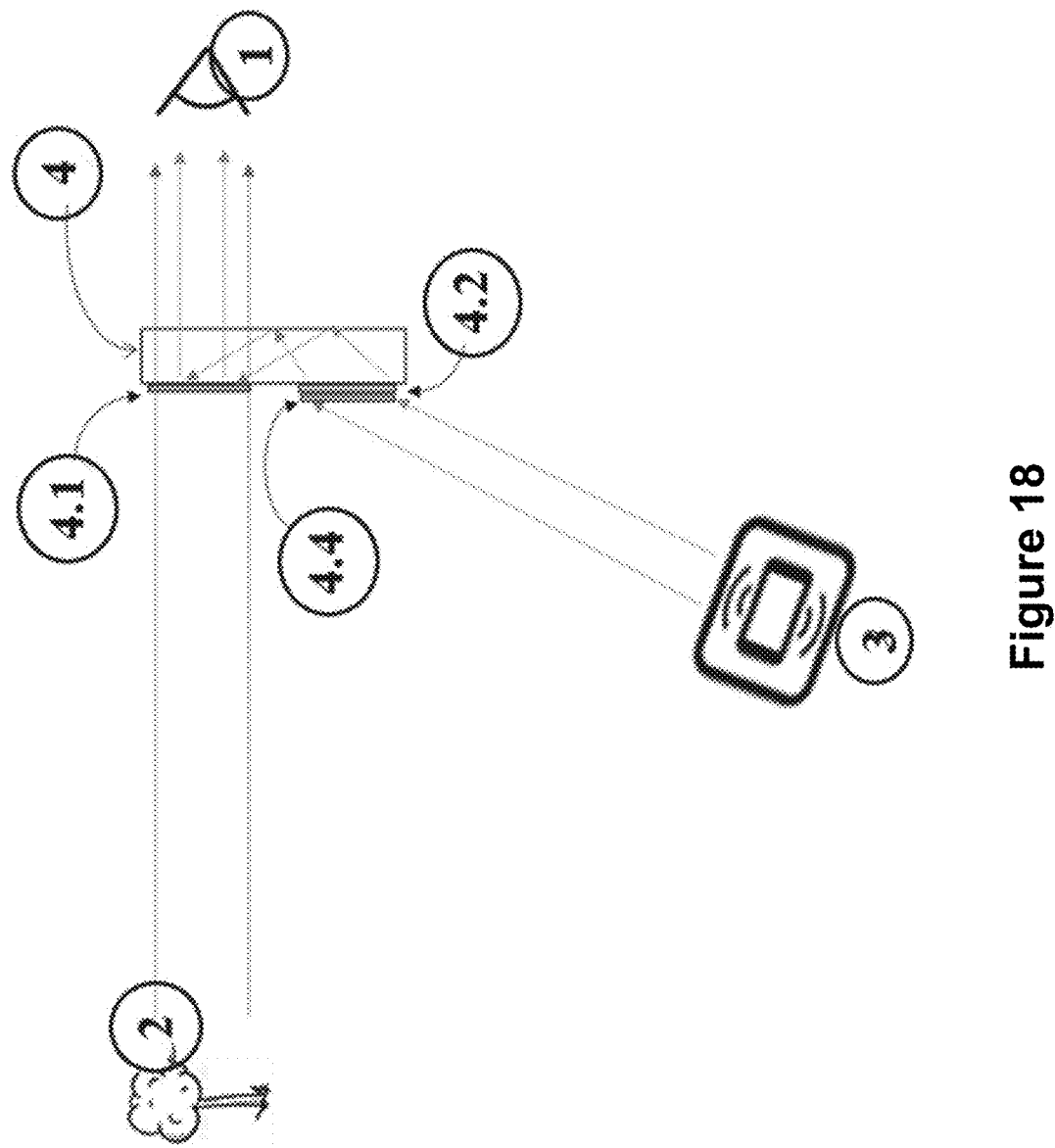
FIG. 18 illustrates an Advanced Innovative Passive Aug-mented Glasses Configuration basic implementation by sur-face optic technologies, alternative layout.

This optical system can further have an additional optical
shutter 4.4 over the Plano spherical lens 4.3 is shown in FIG. 18, which gives the system an option to close the optical pass
of the handheld display 3 instead of the "flip" option. The
optical shutter can be provided in a variety of technologies
known in the art like mechanical, polarizers, electronic,
dichroic, light sensitive and more.

Figure 17:
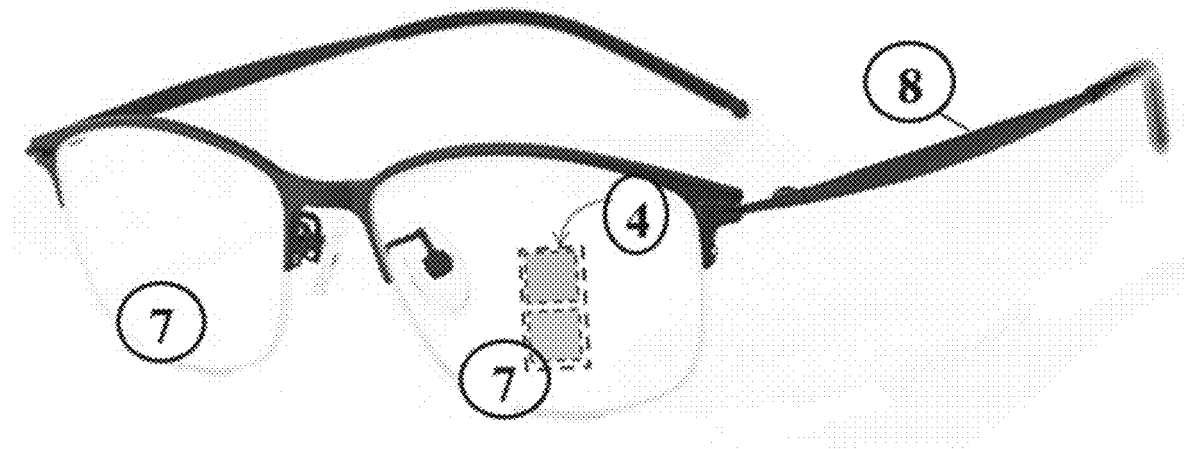
FIG. 17 illustrates an Advanced Innovative Passive Aug-mented Glasses Configuration implemented on user glasses.

The layout of the Glasses Passive Augmented Configu-
ration illustrated in FIGS. 16, 17 and 18 is implemented with Surface Optic Technologies also known as Thin-Film Tech-
nology. This technology applies to optical systems using the
physics of light waves in thin films, waveguide plate mate-
rials, reflections and losses involved and methods of cou-
pling light beam into and out of a thin film. In addition, thin
film technology uses surface elements and nonlinear inter-
actions in waveguide structures.

BEST MODE FOR CARRYING OUT THE
INVENTION

The modes for carrying out the invention are presented in
terms that disclose a variety of embodiments of a system/
device, as shown and illustrated in FIGS. 4-13, for trans-
mitting the handheld display or head down image to user
head-up sight and superimpose it over viewer surrounding
vision. In some embodiments of the device, the focal image
correction lens/optical element 4.3 may apply to present
both views at the same focal distance for comfortable eye
sight. As shown in FIG. 5, the device 4 may be attached over
prescription or sun glasses frame by "clip" attachment
mechanisms 9 with or without IPD setting/aligning mecha-
nism for best line of sight in the eye device. In some
embodiments of the device of the present invention, a "flip"
mechanism may be implemented and/or eye setting
adjustments for user convenience. In some cases, when the
user prefers to have a binocular vision, usually preferred for
long time usage, a dual function device 4 may be used. The
user can keep his sight over the entire surrounding while
having his mobile device information in front of his sight—
see FIG. 4. A similar situation for car driver is illustrated in
FIG. 7.

The system as shown in FIG. 8, combines two major
elements: a near to eye optical combiner 4.1 that combines
the two interested sights into one by combining surface 6
which can be implemented by semitransparent coating such
as chromatic, selective, grid wire, polarizing etc. coating.
Such coating adjusts the magnitude of each one of the said
preferred sights. The handheld image runs through the
combiner 6 and is reflected to the combiner by reflected
mirror coating 5 to the viewer's eye 1. The optical wedge 4.2
aligns the handheld device normal viewing angle toward the
optical system. The device can optically be enhanced by
adding an Anti-Reflection coating 6.2 over the optical open-
ing surfaces while adding opaque coatings or light blocking
material/housing 6.3 at the device sides.

Figure 9:
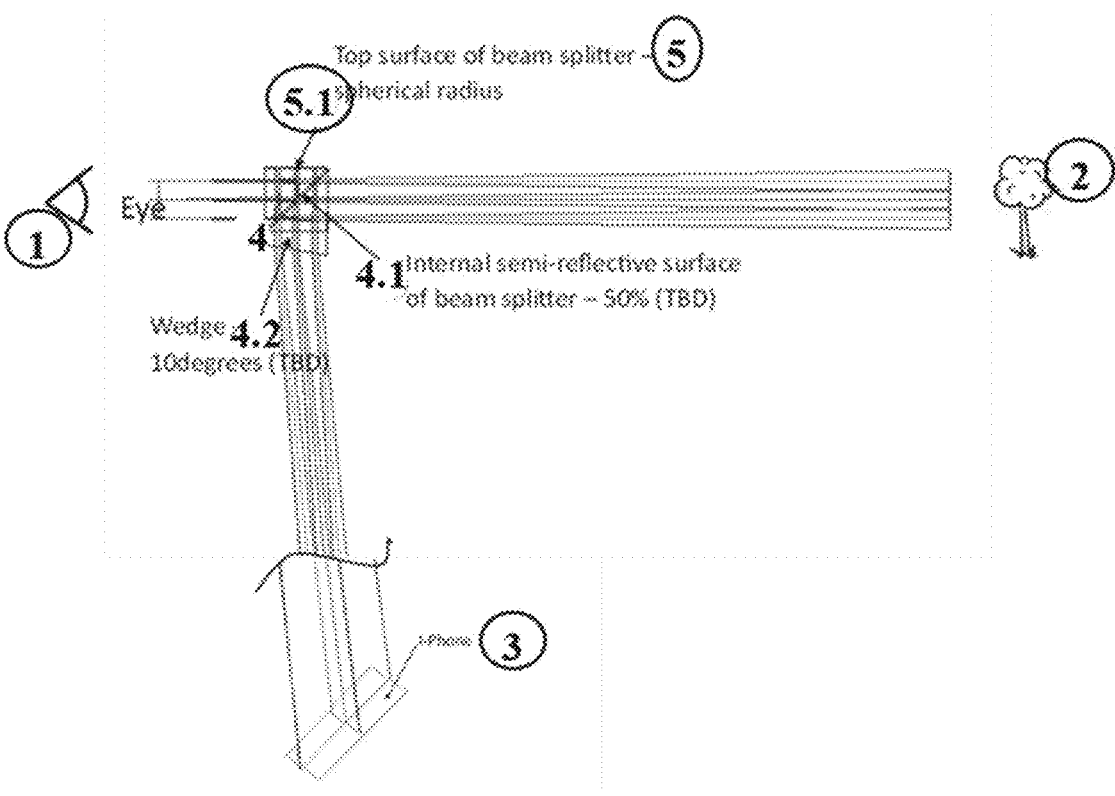
FIG. 9 illustrates a prism solution of Optical Device Basic Innovation Optic Ray Tracing of the present invention.

The system in FIG. 8 has a disadvantage as both images
2 and 3 do not appear at the same focal distance. The focal
point of the scenery view 2 is at infinity and the focal point
of the screen image of the handheld device 3 is at near
distance. As such the user may suffer from eye fatigue due
to continuous alternation between the two views. To solve
this issue, the device of the present invention adds a focal
lens element 5.1 as illustrated in FIG. 9 that adjusts the focal
points of the two images into one and generates a single
focused comprehensive image. The user may look straight-
ahead while getting all his smartphone information 3 and
even operating it with his fingers. The reflection surface 5 is
implemented on the focal lens element in order to keep ray
tracing towards the beam splitter 4.1 to the viewer eye 1. The
beam splitter may adjust its preference pass/reflection by
adjusting the semi-reflective surface 6 properties. FIG. 9
illustrates the detailed optic ray tracing design of this device.

Figure 13:
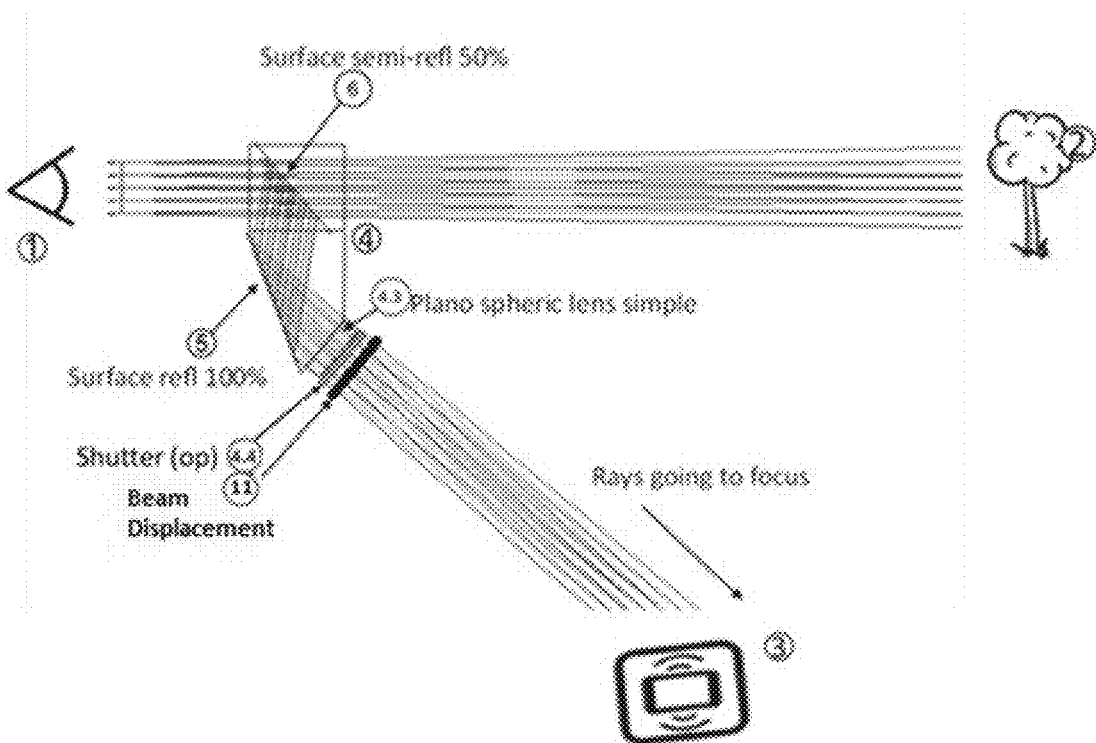
FIG. 13 illustrates an Advanced Innovative Passive Aug-mented Glasses Configuration with preferred Smartphone (3) brightness pass.

The device 4 of the present invention, as described above
may have a more effective optical pass for the handheld
device 3 is illustrated in FIG. 11. The beam splitter transmits
a one ray reflection towards a user's eye, with or without user prescription personal glasses 7. The passive augmented glass ray tracing is illustrated in FIGS. 12 and 13. The design includes a Plano Spheric Lens 4.3 to obtain the same focal plane of the two combined views of interest i.e., see through scenery view 2 and the display image of the handheld device 3. The detailed design is illustrated in FIG. 14, showing the side surface reflection surface 5 implementing the effective ray pass to the user's eye 1.

FIG. 14 discloses herein a typical three-dimensional illustration of the Glasses Augmented Passive Device showing its basic elements and the main ray tracing. It is well understood by any well-known expert in the art that additional Anti Reflection and/or semitransparent, opaque coatings may be implemented at the element ray pass. The Optical Block device 4 may be cut, molded and shaped to get a minimal volume and smooth device edges/corners.

While the Glasses Augmented Passive Device of the present invention is attached to the user glasses frame as shown in FIG. 6, the user may adjust its pitching to allow convenient combined images and hand holding position with the adjusting mechanism 10. An additional optical element Beam Displacement Element 11 is illustrated in FIG. 15. It may be embedded into the Glasses Augmented Passive Device at the image ray pass to allow the user a convenient optic images combination The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A glasses augmented electrically passive device for combining or superimposing over display light corresponding to a display image output from a display of a handheld device and an external scenery normally oriented relative to a user's vision direction, said device comprising:

a) an optical combiner or beam splitter configured for combining or superimposing display light corresponding to said display image and said external scenery;

b) an optical wedge, a reflective element or both for adjusting direction of display light corresponding to said display image to direction of said external scenery; and c) a plano spherical lens with optical power or a reflective surface mirror with an optical power element for collimating or adjusting focal distance of display light corresponding to said display image to focal distance of said external scenery, wherein;

said handheld device is distinct from and external to said device; and combining or superimposing and adjusting direction of said focal distances of display light corresponding to said display image and external scenery generates a single or combined image, said single or combined image appearing as one image at same distance to eye of said user.

2. The glasses augmented electrically passive device according to claim 1, wherein said reflective element is a mirror surface.

3. The glasses augmented electrically passive device according to claim 1, wherein:

said optical combiner or beam splitter comprises an optic surface coating over surface of said optical combiner or beam splitter;

said optic surface coating is made of a technology selected from chromatic coating, selective coating, wire-grid coating, polarizing coating, dielectric coating and thin film coating; and said optic surface coating corrects said same or different reflection/transmission magnitude for each image/vision pass of said display image of said handheld device.

4. The glasses augmented electrically passive device according to claim 3, wherein said optic surface coating or reflective surface element is an optical element or surface that directs or reflects rays coming from said display image of said handheld device within said glasses augmented passive device, wherein said reflective coatings or said reflective surface element is selectively chromatic or polarizing.

5. The glasses augmented electrically passive device according to claim 1, wherein said optical wedge comprises an optical prism attached or embedded within said optical wedge, said optical prism is configured to divert said image to proper line of sight of said external scenery relative said user's eye.

6. The glasses augmented electrically passive device according to claim 1, wherein said optical wedge is a rotating Beam Displacement Element attached to said glasses augmented passive device, said rotating Beam Displacement Element adjusts direction of said display image of said handheld device to direction of said external device scenery in normal line of sight of said user's eye.

7. The glasses augmented electrically passive device according to claim 1, wherein said optical power element of said reflective surface mirror or optical power of said plano spheric lens comprises a lens or an optical focal correction element, said lens or optical focal correction element adjusts said down display image of said handheld device to normal vision focal distance of said user's eye, and applies to any one of optical passes of said display image of said handheld device within inner or outer side of said glasses augmented passive device.

8. The glasses augmented electrically passive device according to claim 1 implemented in part or in all with surface optical elements, said surface optical elements comprising a main Wave Guide optical substrate or are embedded within said vision or sun glasses, wherein said surface optical elements are embedded within lens of said glasses, said surface optical elements are attached to or embedded into Augmented Reality (AR) glasses, said AR glasses are absent of a specific display device, wherein said glasses augmented passive device comprising one or more materials or elements selected from an optical coating, an Anti-Reflective (AR) surface, a transparent or semi-transparent surface an index matching material that correlates light refraction indexes within said device.

9. The glasses augmented electrically passive device according to claim 8, further comprising an optical shutter over one image optical pass, wherein said optical shutter keeps view of said user observing one preferred vision, wherein said optical shutter is selected from a mechanical, polarizing, electronic, dichroic and light sensitive optical shutter.

10. The glasses augmented electrically passive device according to claim 8, wherein said surface optical elements are selected from Thin-Film and\or Diffractive optical elements (DOE), Holographic Optical Element (HOE), Fresnel Optic Technology (FOT), Meta Optical Elements (MOE) and a surface mounted optics incorporating thin film element properties.

11. The glasses augmented electrically passive device according to claim 1 implemented in part and/or assembled by several optical elements and/or fabricated as one Optical Block, wherein said Optical Block is mounted on or embedded in part and\or in all within said vision or sun glasses, said device is fitted to a user's IPD (Interpupillary Distance) and center Line of Sight (LOS).

12. The glasses augmented electrically passive device according to claim 1, wherein said device is monocular on one lens of said glasses or binocular on two lenses of said glasses, said device is attached or embedded on said one or two glasses and operates with same or different mechanism for each eye of said user.

13. The glasses augmented electrically passive device according to claim 1, comprising one or more of said reflective element, reflective surface coating over surface of said optical reflective surface or optical wedge for redirecting said display image of said handheld device towards optical pass of said external scenery.

14. The glasses augmented electrically passive device according to claim 1, wherein said left and right sides of surfaces of said device are coated with opaque paint/coating or Anti Reflective (AR) coating for avoiding infiltration of undesired straylight into said device.

15. The glasses augmented electrically passive device according to claim 1, further comprising a Beam Displacement element configured to adjust an operating angle between said display image of said handheld device and said external scenery, wherein said Beam Displacement element applies parallel light passages for said display image of said handheld device and said external scenery with mechanical means, said mechanical means adjusting a desired direction such that said display image of said handheld device appears clearly within said external scenery as viewed by said user's eye.

16. The glasses augmented electrically passive device according to claim 1, further comprising mechanical "Clip-on" means for mounting said device over prescription or corrective glasses or sunglasses, said "Clip-on" means are attached to frame of said glasses, wherein said "Clip-on" means comprises an adjustment mechanism for adjusting said device to center Line of Sight (LOS) and IPD (Interpupillary Distance) of said user.

17. The glasses augmented electrically passive device according to claim 16, further comprising mechanical "Flip-up" means for lifting or turning position of said device for a clear vision of said external scenery, wherein said "Clip-on" and "Flip-up" mechanisms are combined as one and/or support a monocular or binocular glasses augmented passive device.

18. The glasses augmented electrically passive device according to claim 1, further comprising mechanical "Flip-up" means for lifting or turning position of said device for a clear vision of said external scenery.

19. The glasses augmented electrically passive device according to claim 1, further comprising an optical shutter over one image optical pass, wherein said optical shutter keeps said user observing one preferred vision of said display image of said handheld device or external scenery, wherein said optical shutter is selected from a mechanical, polarizing, electronic, dichroic and light sensitive shutter.

20. The glasses augmented electrically passive device according to claim 1 further comprising one or more materials or elements selected from an optical coating, an Anti-Reflective (AR) surface, a transparent or semi-transparent surface an index matching material that correlates light refraction indexes within said device.

21. The glasses augmented electrically passive device according to claim 1, wherein the glasses augmented electrically passive device is configured to operate without electrical power.

22. The glasses augmented electrically passive device according to claim 1, wherein the glasses augmented electrically passive device is configured to receive display light at an optical surface of the glasses augmented passive device.

23. The glasses augmented electrically passive device according to claim 1, wherein the glasses augmented electrically passive device is configured to receive light corresponding to the display image without requiring an electrical connection to the handheld device.

* * * * *